United States Patent [19]

Talmage, Jr. et al.

[11] Patent Number: 4,797,514
[45] Date of Patent: Jan. 10, 1989

[54] TOUCH SENSITIVE DEVICE WITH INCREASED LINEARITY

[75] Inventors: John E. Talmage, Jr., Anderson County; William A. Gibson, Knox County, both of Tenn.

[73] Assignee: Elographics, Inc., Oak Ridge, Tenn.

[21] Appl. No.: 871,991

[22] Filed: Jun. 9, 1986

[51] Int. Cl.⁴ .............................................. G08C 21/00
[52] U.S. Cl. ...................................................... 178/18
[58] Field of Search ............................. 178/18, 19, 20

[56] References Cited

U.S. PATENT DOCUMENTS 4,622,437 11/1986 Bloom et al. ........................ 178/18

Primary Examiner—Stafford D. Schreyer
Attorney, Agent, or Firm—Pitts and Brittian

[57] ABSTRACT

An electrographic touch sensor of simplified construction having an increased proportion of area for providing linear output signals. The sensor utilizes a resistive layer of a substantially uniform resistivity throughout. A resistance element of resistance value borders and is in contact with the resistive layer. Positioned along a selected path proximate the resistance element borders are a plurality of insulator regions having a selected effective length along the path to define spaces of a selected effective length therebetween. These spaces, having the resistive layer therein, define resistive electrode elements by which voltages are applied from the resistance element borders into the resistive layer whereby orthogonal electrical fields can be generated in the resistive layer. The effective length of the insulator regions and the spaces are chosen to produce a voltage gradient along the path that substantially compensates for any voltage drop along the resistance element while orthogonal fields are being generated. In this manner, an increased proportion of the resistive layer provides a linear response in the output signals. Provision is made to generate output signals corresponding to the coordinates of a selected point on the resistive layer.

19 Claims, 2 Drawing Sheets

TOUCH SENSITIVE DEVICE WITH INCREASED LINEARITY

DESCRIPTION

1. Technical Field

The present invention relates to devices for determining the coordinates of a location in a two-dimensional system, and more particularly to an electrographic touch sensor that is easily fabricated and whereby such points can be determined with good linearity throughout an increased proportion of the area of the sensor.

2. Backqround Art

There are many fields of technology where it is desirable to generate electrical signals that are proportional to some physical point in a two-dimensional planar or non-planar coordinate system. For example, it is often desirable to accurately reconstruct graphs or other technical data representation, to store such data in computers, or to provide touch sensors for a variety of applications. A device which has come into use for this purpose is known as an electrographic sensor wherein orthogonal electrical fields are produced, one in a X direction and one in a Y direction, in the coordinate system. Contact or other interaction with the sensor at a specific location with a finger or other object causes the generation of signals that are representative of the X and Y coordinates of that particular point.

Orthogonal X and Y electrical fields of the devices of this type have been generated by numerous types of systems. For example, parallel electrodes have been placed on opposite edges of two spaced apart sheets with the electrodes on one sheet oriented orthogonally to those on the second sheet. The electrical field in one direction is generated in one sheet with a voltage applied to the set of electrodes on that sheet, and the orthogonal field is generated in the second sheet by applying a voltage to its electrodes. In another configuration, however, the orthogonal electrical fields are generated in a single sheet, with various configurations of electrodes along the edges of the sheet, with the voltage applied to these electrodes in a properly timed sequence. One typical group of single sheet sensors utilizes resistive-type electrodes in contrast to another group that utilize diodes to apply the necessary voltages.

In the single sheet type apparatus using resistive electrodes, it is well recognized that equipotential lines generated by the electrodes in the center of the sheet are generally straight parallel lines in each of the directions. However, as the perimeter of the sheet is approached, these equipotential lines deviate from the ideal by being non-parallel curved lines. The curvature, i.e., bow, is produced by the voltage drop in the resistive electrodes. If a high linearity device is desired, such can be achieved near the center of the device, but not at the edge of the device because of these non-parallel bowed equipotential lines near the edge.

In order to achieve high linearity throughout a larger area of the device, many special systems of electrodes have been devised to increase the region of linearity of the instrument. For example, in U.S. Pat. No. 3,798,370, issued to G. S. Hurst on Mar. 19, 1974, (which patent has a common assignee with this application) electrodes for the application of the voltage to the sheet are arranged in a curve or bow along each edge whereby the voltage drops in the resistive element along the edges of the device are at least partially compensated. This is discussed with reference to FIG. 2 therein.

In a like manner, special electrode configurations are shown and described in U.S. Pat. No. 4,079,194, issued to V. Kley on Mar. 14, 1978; and in U.S. Pat. No. 4,178,481, issued to the same inventor on Dec. 11, 1979. In these patents, special electrode configurations are used to reduce the bow to increase the effective area of a given sized sensor.

Another complex "electrode" configuration is shown in U.S. Pat. No. 4,293,734, issued to W. Pepper, Jr., on Oct. 6, 1981. This is one of a series of patents issued to Pepper. These electrodes occupy a considerable space along the edge of the sensor (see FIGS. 3 and 8 of Pepper, for example). Also, in Pepper the network disclosed combines both the peripheral resistance network and the electrodes for introducing potentials into the resistive layer whereby a change in one effects the other and thus does not provide individual adjustment.

Still another patent in the general field of "sensors" is U.S. Pat. No. 4,493,104, issued to L. J. Lukis, et al., on Jan. 8, 1985. In that patent is described a unit having a linear voltage drop and a linear voltage gradient along each edge. A linear voltage drop, as achieved, actually implies bowed equipotential field lines; this then would require some means for reducing the bow to achieve a maximum active area between the edges of the sensor. The patent does not address the matter of bowed fields.

Numerous types of sensors are utilized as an overlay to a video display such as a computer terminal in the form of a cathode ray tube. Such displays have outwardly curved (convex) edges. When sensors of the prior art with inwardly extending electrodes (or at least inwardly directed bowed fields) are used on these display devices, the active area of a sensor is less than the potentially available area of the display.

One system for reducing the bow in equipotential lines, and thus increasing the effective size of a given sensor, is described in our copending patent application, Ser. No. 685,348, filed Dec. 24, 1984, now U.S. Pat. No. 4,661,655 issued Apr. 28, 1987. That system utilized a single row of electrodes along each edge of the ressstive layer of the sensor where the length of the electrodes, their spacing and the amount of voltage applied to each is selected whereby the voltage gradient along the line of electrodes overcomes the voltage drop along a resistor element which provides the voltages to the electrodes. A modification of that system is described in continuation-in-part application filed by us on June 5, 1986, U.S. patent application Ser. No. 870,848.

Accordingly, it is a principal object of the present invention to produce an electrographic sensor for determining planar coordinates with high linearity, such sensors having a minimum area devoted to means for generating electrical fields therein.

It is another object of the present invention to provide a sensor which may be used over the screen of video display devices which results in an optimum utilization of the space thereof.

It is another object of the present invention to provide a single sheet sensor that can be inexpensively produced which will substantially eliminate the bow normally found in prior art devices.

These and other objects of the present invention will become apparent upon the consideration of the following description with reference to the drawings referred to therein.

DISCLOSURE OF THE INVENTION

According to the present invention, there is provided a layer of resistive material having a highly uniform resistivity. This layer may be either transparent or opaque and is formed using conventional technology. Positioned along and in electrical contact with this layer at each edge thereof is a resistance element by which selected voltages are applied to the layer along the edges. Current flow from the resistance element into the resistive layer is restricted to regions of selected width by providing an aligned row of insulator regions where the resistive layer is absent such that the current flow is through the spaces between those insulator regions. The insulator regions are preferably relatively long, in the direction of the row, and relatively narrow in a direction transverse to the row. This limitation of current flow to the intervening spaces produces a selected voltage gradient along the row. Specifically, the effective voltage gradient along the row is selected to counteract the bow that otherwise would exist due to voltage drop along the resistance element.

DETAILED DESCRIPTION OF THE INVENTION

Figure 1:
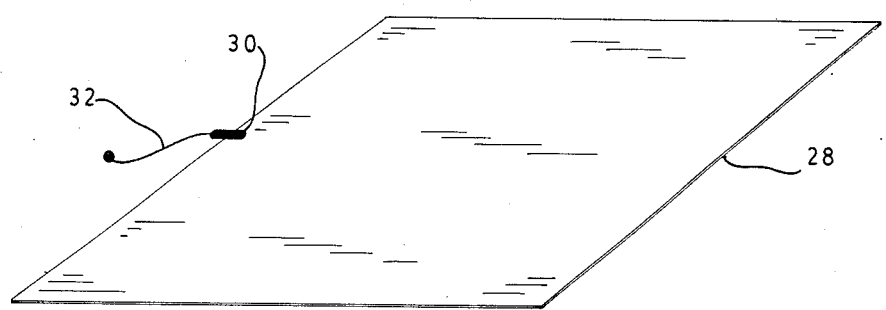
FIG. 1 is a view of a device constructed according to the present invention with the components illustrated as separated (exploded) only to more fully show the components thereof.
Figure 1:
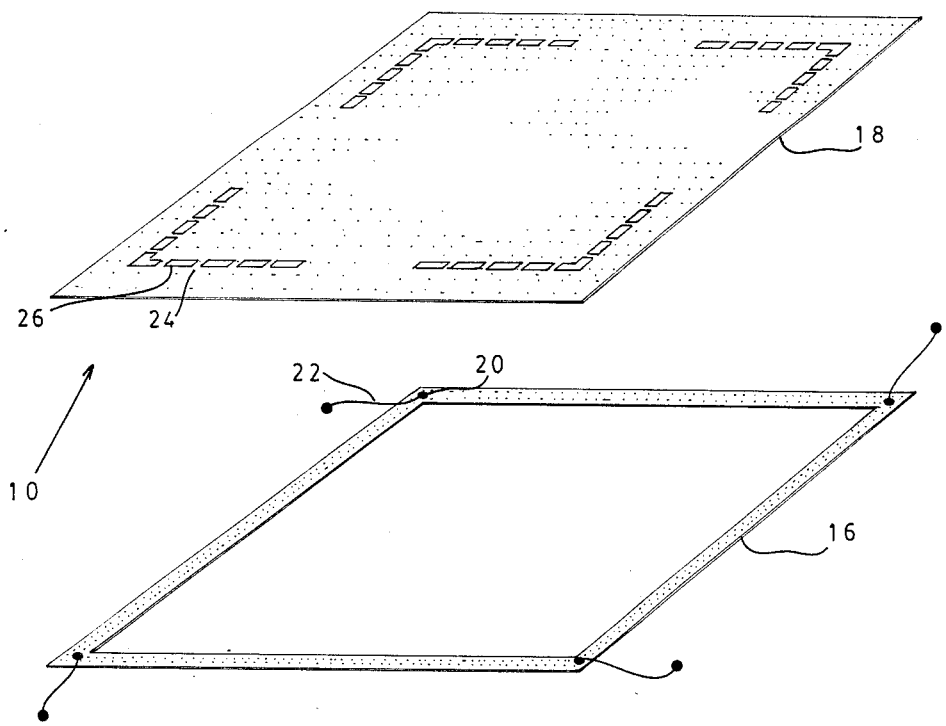
Figure 1:
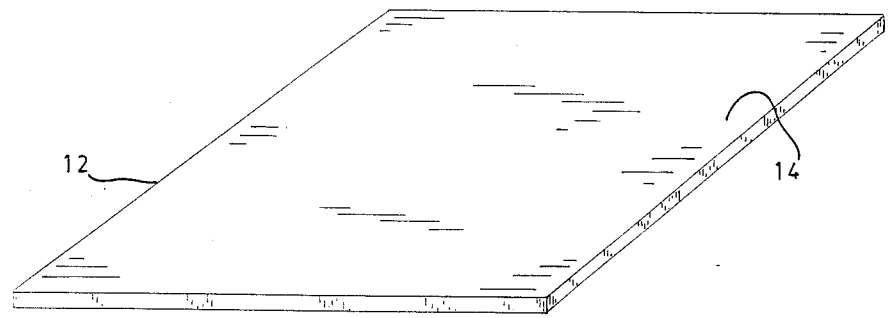

Referring now to FIG. 1, shown therein generally at 10 is an exploded view of a device for accomplishing the above-stated objects. It will be recognized by those versed in the art, upon a consideration of the entire Specification, that the illustrated components are separated in this FIG. 1 only for the purposes of a clearer explanation rather than to imply that the components must be separable. In the specific embodiment illustrated in FIG. 1, there is a support 12 which can be considered a substrate. This substrate 12 can be either rigid or flexible. Applied to an upper surface 14 of the substrate is a border member 16 of resistance material. The resistance value and configuration of this border will be discussed hereinafter. The purpose of this border is to introduce electric fields into a resistive layer 18 which is in electrical contact with the resistance border. An equivalent structure would be produced by applying the resistive layer 18 to surface 14 of the substrate, and then applying the resistance border 16 on top or in near proximity. In order to create the electric fields, appropriate voltages are applied at each of the corners, e.g. 20, of the resistance border 16 via electrical leads, e.g. 22.

The voltage is impressed upon the active area of the sensor through "resistor electrode elements" 24 that are produced through the use of insulator regions 26. As used herein, the term "insulator region" is meant to mean a region that is devoid of the resistive layer. These insulator regions 26 are narrow (substantially rectangular in the illustrated embodiment) and are oriented in a row near the inner edge of the resistance border 16. Typically, the insulator regions are created by preventing the deposition of the resistive layer in these regions, or by removing the deposited resistive layer by appropriate means. The width of these insulator regions 26 and their effective length (effective length facing active area) which affects their spacing along the row, are selected whereby the resultant resistor electrode elements therebetween achieve a voltage gradient along the row which compensates for the voltage drop along the resistance border 16. The effect, but not the structure, is equivalent to that of the electrodes described in the above-cited U.S. Pat. No. 4,661,655, such that the bow of equipotential lines in the active area of the sensor is substantially eliminated.

The shape of the insulator regions is not limited to being rectangular. Other configurations, such as oval, circular, etc., are also suitable, particularly if the insulator regions are small in size.

Figure 2:
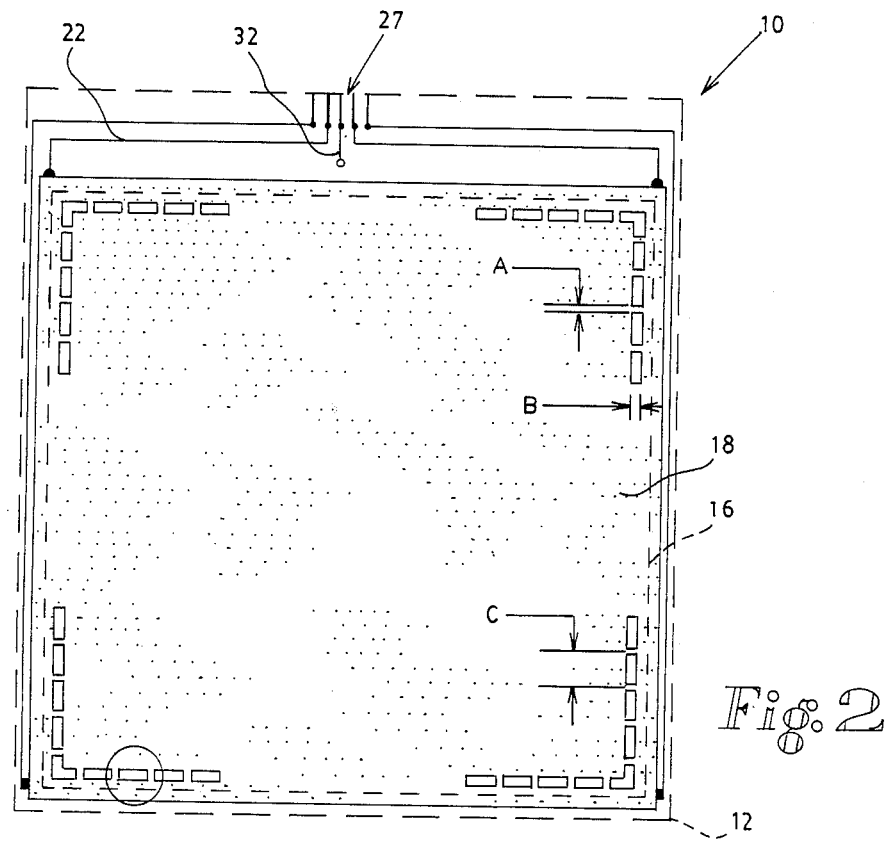
FIG. 2 is a plan view illustrating one embodiment of the present invention showing the surface area of the resistive layer and the leads for the resistance element and contact sheet, with the device mounted on a substrate.
Figure 2A:
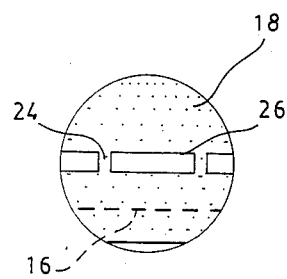

The particular configuration (shape and size) of insulator region 26 illustrated in FIGS. 1 and 2 is typical for a small sensor, e.g., 4×4 inches. In such sensors, the control of the bow is most critical in each outer one-third of an edge toward the corners. Thus, in this embodiment, the insulator regions are only located in these portions to simplify fabrication. A uniform size and spacing sufficiently compensates for the voltage drop in small units. Typically for this size of sensor the center-to-center spacing, C, of the gaps between insulator regions is 0.25 inch. The width, B, (perpendicular to the active region) of the insulator regions is typically 0.05 inch, and each space, A, therebetween forming the resistor electrode elements is typically 0.04 inch. Thus, the resistor electrode elements are 0.04×0.05 inch in this embodiment. The actual resistance value is then dependent upon this spacing size and the resistivity of the resistive layer.

Although the resistive layer and the resistance elements along the edge can have different values of resistivity, a typical value for the resisitivity of the resistive layer ($R_L$) is 10,000 ohms per square. This can be achieved, for example, by screen printing using an appropriate ink as will be known by those versed in the art. For this value, the resistance elements (typically a strip 0.1 inch wide) can have a resistance value ($R_E$) of 100 ohms per square giving a ratio ($R_L/R_E$) of about 100.

The resistance element 16 as illustrated in the figures is depicted as a continuous resistance element in continuous contact with the resistive layer. This is typically formed, as indicated hereinafter, by depositing a strip of resistance material having a resistivity of about 0.01 the value of the resistivity of the resistive layer. A typical width of this strip is 0.1 inch.

However, although this construction is preferred, the present invention is not limited to this construction of the border resistance elements. For example, a strip of resistive tape can also be used which produces either continuous or random electrical contact with the resistive layer. Also, a continuous resistance element can be used which is electrically connected to the resistive layer at discrete locations. This can be, for example, similar to the wire that is shown in the aforementioned U.S. Pat. No. 4,661,655. Still another construction is the discontinuous resistance element as described in the aforementioned U.S. patent application Ser. No. 870,848. The contents of these patent applications are hereby incorporated by reference. Any of the alternative constructions can be either applied to (or be covered by) the resistive layer or can be positioned proximate the perimeter edges of the resistive layer.

It can be seen in FIG. 2 that each corner of the resistance border 16 is typically connected through a trace, e.g., 22, to a connector 27 whereby the sensor 10 can be fastened to a cable leading to appropriate circuitry. This cable would supply, for example, voltages in proper sequential order whereby orthogonal equipotential fields are established within the resistive layer 18.

Referring again to FIG. 1, shown therein is a pick-off sheet 28 which in its most general form is a flexible conductive sheet having a lead 32 attached thereto as at 30 (see FIG. 2 as to lead 32 being attached to connector 27. Although not shown, islands of insulative material are typically interposed between the resistive layer 18 and the pickoff sheet 28 to prevent inadvertent contact but permit intentional contact when the pickoff sheet is depressed at a selected point. During this contact, voltage signals will be obtained that relate to the coordinates of the contacted point. Other separation means, including an air gap, can also be used to prevent inadvertent contact.

Although a pickoff sheet is illustrated for obtaining output signals, other systems of obtaining such signals are useful with the present invention. For example, a conductive probe can be used to touch the resistive layer. Also, a capacitive or resistive element (finger or probe) can be used to be placed adjacent (or contact) a selected position on the sensor.

Figure 3:
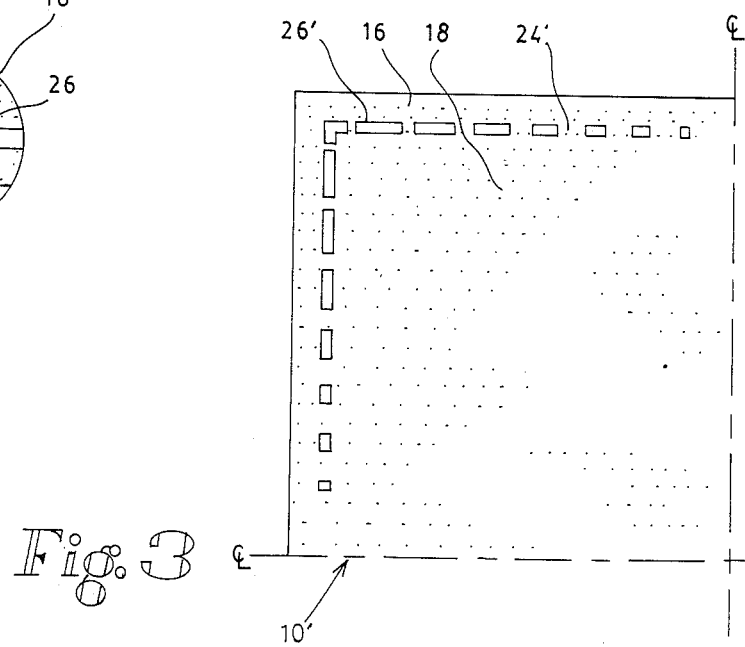
FIG. 3 is a partial plan view illustrating another embodiment of an arrangement of insulative regions for use on larger sensors.

Although the uniform sized insulative regions illustrated in FIGS. 1 and 2 are satisfactory for small sensors, larger sensors experience a greater voltage drop along the resistance element 16 and thus a more careful generation of the voltage gradients must be achieved. Such a construction is illustrated in the partial plan view of FIG. 3 showing one quadrant of a typical sensor 10'. Since the voltage gradient needs to decrease from the corners of the sensor toward the center of each edge, in this embodiment the insulative regions 26' are formed with decreasing length toward the center, and the gaps 24' (the resistors) increase in width. Typically for a sensor measuring twelve (12) inches along an edge, the insulator regions decrease from about 1.0 to 0.2 inch, and the intervening spaces increase from about 0.025 to 0.8 inch for a resistivity of the resistive layer of 10,000 ohms per square. The resistivity of the strip resistance element is typically 100 ohms per square and 0.1 inch wide.

With the construction of either FIG. 2 or FIG. 3, substantially non-bowed electric equipotential lines are produced when appropriate voltages are applied. In this way, essentially all of the area between the opposite rows of insulative regions is usable for the active area of the sensor. Thus, a very small border of non-usable region exists, and this peripheral border is easily covered with a bezel or the like of a display unit.

From the foregoing, it can be seen that a position sensitive device has been achieved wherein a maximum active area is achieved by substantially eliminating the bow of equipotential lines proximate the edges of the sensor. In particular, this improvement is achieved using substantially simplified fabrication steps. Both the resistance border (of any of the configurations discussed above) and the resistive layer are produced typically by screen printing of an appropriate ink if the sensor is to be opaque. For a transparent sensor, the resistive layer can be a semiconducting metal oxide, for example, deposited upon a transparent substrate. The resistance border can be applied by screen printing using an appropriate ink since this portion does not need to be transparent. In either an opaque or a transparent sensor, the insulative regions proximate the edges are formed by either not depositing the resistive coating (particularly easily done for opaque sensors) or by removing the coating in these regions after a deposition of the resistive coating over the complete surface. Furthermore, the traces (e.g., 22) can be formed by the screen deposition of conductive material.

Although only specific embodiments are described herein, it will be recognized by persons versed in the art that the teachings contained herein will permit fabrication of other embodiments of the present invention. For example, although the insulation regions are shown as being aligned along a straight row, such row of regions can be bowed as may be desirable or necessary for a specific application. Accordingly, the present invention is not limited by these embodiments but only by the appended claims and their equivalents.

We claim:

1. A position touch sensor which provides a linear output response over an enhanced proportion of the surface area of said sensor by reducing the bow of equipotential lines along edges of said sensor, which comprises:

a resistive layer having a selected substantially uniform resistivity throughout said layer, said layer defining perimeter edges joined at corners;

a resistance element positioned proximate each of said perimeter edges of said resistive layer for providing orthogonal electrical fields to said resistive layer, each of said resistance elements having opposite ends joined to proximate ends of adjoining resistance elements, each of said resistance elements being in electrical contact with said resistive layer;

a plurality of discontinuous insulator regions of selected effective lengths in said resistive layer arranged along a selected path proximate said resistance elements in a direction toward said area of linear output, and defining spaces of selected effective lengths and width between adjacent of said insulator regions, said resistivity of said resistive layer producing in said spaces resistor electrode elements having selected values of resistance, said selected effective lengths of said insulator regions and said selective resistance values of said resistor electrode elements being selected to produce a selected voltage gradient along said path to compensate for any voltage drop along said resistance element when said orthogonal fields are introduced into said resistive layer through said resistor electrode elements whereby said bow is reduced; and means for deriving output signals corresponding to coordinates of a selected point on said resistive layer within said area of linear output.

2. The sensor of claim 1 wherein said resistance element is continuous, has a uniform resistivity and is in continuous contact with said resistive layer at said perimeter edges.

3. The sensor of claim 1 wherein said means for deriving output signals is a capacitive element for placement adjacent said resistive layer at said selected point, and a circuit connected to said ends of said resistance elements to measure the effect of said capacitive element at said selected point and produce said output signals.

4. The sensor of claim 1 wherein said means for deriving output signals is a capacitive element for placement in contact with said resistive layer at said selected point, and a circuit connected between said capacitive element and said ends of said resistance elements to measure the effect of said capacitive element at said selected point and produce said output signals.

5. The sensor of claim 1 wherein said means for deriving output signals is a resistive element for placement in contact with said resistive layer at said selected point, and a circuit connected between said resistive element and said ends of said resistance element to measure the effect of said resistive element at said selected point and produce said output signals.

6. The sensor of claim 1 wherein said means for deriving output signals comprises a circuit connected to said ends of said resistance elements to introduce orthogonal electrical fields in said resistive layer and a conductive means for contacting said resistive layer at said selected point to obtain voltage signals from said resistive layer at said point.

7. The sensor of claim 6 wherein said conductive means is a conductive flexible pickoff sheet uniformly spaced from said resistive layer and further comprises means for preventing inadvertent contact between said pickoff sheet and said resistive layer but permitting intentional contact at said selected point.

8. The sensor of claim 7 wherein said means for preventing inadvertent contact is a plurality of insulative islands positioned between said resistive layer and said conductive flexible pickoff sheet.

9. The sensor of claim 1 wherein said selected effective length of said insulator regions decreases from each corner of said resistive layer toward a centerline of each of said perimeter edges, and said effective length of spaces between adjacent of said insulative regions increases from each corner of said resistive layer toward said centerline of said perimeter edges, and all of said insulator regions are uniform in width perpendicular to said path.

10. The sensor of claim 1, wherein said insulator regions are positioned along a selected portion of said path, said selected portion being substantially one third of said perimeter edges of said resistive layer closest to said corners, said selected effective length of said insulator regions being uniform and said selected effective length of said spacings between said insulator regions being uniform, said insulator regions having a uniform width perpendicular to said path.

11. The sensor of claim 10 wherein each of said perimeter edges is about four inches, said selected effective length of each of said insulator regions is about 0.25 inch, said insulator regions are about 0.05 inch wide, said selected length of said spaces between insulator regions is about 0.04 inch, said resistivity of said resistive layer is about 10,000 ohms per square, and said resistance elements have a resistivity of about 100 ohms per square.

12. The sensor of claim 6 wherein each of said perimeter edges is about twelve inches, said selected effective length of said insulator regions uniformly decreases from about 1.0 inch proximate said corner to about 0.2 inch at said centerline, said selected length of said spaces between said insulator regions increases from about 0.025 inch proximate said corner to about 0.8 inch at said centerline, said resistivity of said resistive layer isaabout 10,000 ohms per square, and said resistivity of said resistance element is about 100 ohms per square.

13. A position sensitive touch sensor which provides an active area having a linear output response over an enhanced proportion of the surface area of said sensor by reducing the bow of equipotential lines along edges of said sensor, which comprises:
a resistive layer of a material having a selected substantially uniform resistivity, $R_L$, throughout said layer, said layer defining perimeter edges joined at corners;
a continuous resistance element having a substantially uniform resistivity, $R_E$, throughout in continuous electrical contact with each of said perimeter edges of said resistive layer for providing voltages to said resistive layer to produce orthogonal equipotential fields in said resistive layer, said resistivity $R_E$ being about 0.01 times said resistivity $R_L$;
a plurality of discontinuous insulator regions devoid of said resistive layer material having selected effective lengths arranged along a selected path in said resistive layer proximate said resistance elements in a direction toward said active area from said resistance elements, said insulator regions defining spaces of selected effective lengths and width between adjacent of said insulator regions, said resistivity of said resistive layer producing in said spaces resistor electrode elements having selected values of resistance, said selected effective lengths of said insulator regions and said selective resistance values of said resistor electrode elements being selected to produce a selected voltage gradient along said path to compensate for a voltage drop along said resistance elements when said orthogonal fields ar introduced into said resistive layer by voltages applied through said resistor electrode elements, whereby said bow is reduced; and
means for deriving output signals corresponding to coordinates of a selected point on said resistive layer within said active area, said means including voltage means for producing said orthogonal fields, a conductive means for contacting said resistive layer at said selected point and circuit means connected between said conductive means and said resistance elements for determining potentials of said fields at said selected point as a measure of coordinates of said selected point.

14. The sensor of claim 13 wherein:
said sensor is about twelve inches square;
said resistivity, $R_L$, of said resistive layer is about 10,000 ohms per square;
said resistivity, $R_E$, of said resistance element is about 100 ohms per square;
said selected width of said insulator regions is about 0.05 inch;
said selected effective length of said insulator regions decreases from about 1.0 inch proximate said corners of said resistive layer to about 0.2 inch proximate a midpoint of each of said perimeter edges; and
said selected effective length of said intervening spaces increases from about 0.025 inch proximate said corners to about 0.8 inch proximate said midpoint.

15. The sensor of claim 13 wherein:
said sensor is about four inches square;
said resistivity, $R_L$, of said resistive layer is about 10,000 ohms per square;

said resistivity, $R_E$, of said resistance element is about 100 ohms per square;

said selected width of said insulator regions is about 0.05 inch;

said insulator regions are uniform and are positioned from proximate said corners to one-third the distance toward opposite corners along each of said perimeter edges on a center-to-center spacing of about 0.25 inch; and said selected length of said intervening spaces is about 0.04 inch.

16. The sensor of claim 13 wherein said insulator regions are substantially rectangular and said intervening spaces are substantially rectangular.

17. The sensor of claim 13 further comprising means for deriving output signals from said sensor, said output signals corresponding to coordinates of a selected point on said resistive layer within said active area having a linear output response.

18. The sensor of claim 17 wherein said means for deriving output signals comprises:

a circuit connected to ends of said resistance element along each of said perimeter edges of said resistive layer to introduce voltages through said resistor electrode elements to produce said orthogonal fields in said resistive layer;

a conductive flexible pickoff sheet uniformly spaced from said resistive layer, said pickoff sheet adapted for intentional contact with said resistive layer at said selected point to receive voltages corresponding to coordinate voltages in said resistive layer due to said orthogonal field;

insulative islands positioned between said resistive layer and said pickoff sheet to prevent inadvertent contact but permit said intentional contact of said pickoff sheet and said resistive layer; and circuit means connected to said pickoff sheet to measure said received voltages and derive said coordinates of said selected point.

19. A position sensitive touch sensor which provides an active area having a linear output response over an enhanced proportion of the surface area of said sensor by reducing bow of equipotential lines in said active area, which comprises:

a resistive layer of a material having a substantially uniform resistivity of about 10,000 ohms per square said layer defining perimeter edges of about 4 inches, said perimeter edges defining corners;

a continuous resistance element having a substantially uniform resistivity of about 100 ohms per square in contact with said resistive layer proximate each of said perimeter edges, each of said resistance elements joined at ends to an adjoining resistance element proximate said corners;

a plurality of discontinuous substantially rectangular regions devoid of said resistive layer material arranged along a path proximate said resistance element toward said active area, said regions being of uniform size and positioned along said path from proximate corners of said resistive layer to one-third the distance toward opposite corners along each of said perimeter edges, said regions having a width perpendicular to said path of about 0.05 inch and being spaced on about 0.25 inch centers, said discontinuous regions defining intervening spaces in said one-third distance of about 0.04 inch having said resistive layer material in said spaces;

a conductive flexible pickoff sheet uniformly spaced from said resistive layers with spaced-apart insulative islands positioned between said resistive layer and said pickoff sheet to prevent inadvertent contact between said resistive layer and said pickoff sheet;

circuit means connected to said ends of said resistance elements to provide voltages to said resistance elements and thereby produce said equipotential lines in said resistive layer; and further circuit means connected between said pickoff sheet and said ends of said resistance elements to derive output signals corresponding to coordinates of a point of contact between said pickoff sheet and said resistive layer.

* * * * *